United States Patent [19]
Von Metnitz et al.

[11] 3,880,915
[45] Apr. 29, 1975

[54] METHOD FOR PREPARATION OF $\Delta^{2,5}$-CYCLOHEXADIENE DICARBOXYLIC ACID-1,2 BY REDUCING AQUEOUS SOLUTIONS OF ALKALI PHTHALATE WITH ALKALI AMALGAM

[75] Inventors: Harald Von Metnitz, Cologne; Otto Bleh, Bergheim; Arnold Lenz, Cologne-Stammheim, all of Germany

[73] Assignee: Dynamit Nobel Aktiengesellschaft, Troisdorf, Germany

[22] Filed: Oct. 20, 1971

[21] Appl. No.: 191,130

[30] Foreign Application Priority Data
Oct. 30, 1970  Germany............................ 2053289

[52] U.S. Cl. ............................................ 260/514 K
[51] Int. Cl. ............................................ C07c 51/36
[58] Field of Search .............................. 260/514 K

[56] References Cited
OTHER PUBLICATIONS
McDonald et al., J. Org. Chem., 32, 1878, (1967).
Wiberg, Organic Chemistry, 213, (1960).
Goldstein et al., JACS, 87, 1925, (1905).
Willstatter et al., Chemische Berichte, 61, 872, (1928).

*Primary Examiner*—Robert Gerstl
*Attorney, Agent, or Firm*—Burgess, Dinklage & Sprung

[57] ABSTRACT

A method for preparing $\Delta^{2,5}$-cyclohexadiene dicarboxylic acid-1,2 is disclosed. The process involves reduction of an alkali phthalate by means of an alkali metal amalgam. The disclosed method has particular utility in that an efficient means for selectively reducing phthalic acid to $\Delta^{2,5}$-cyclohexadiene dicarboxylic acid-1,2 is provided.

11 Claims, No Drawings

METHOD FOR PREPARATION OF Δ²,⁵-CYCLOHEXADIENE DICARBOXYLIC ACID-1,2 BY REDUCING AQUEOUS SOLUTIONS OF ALKALI PHTHALATE WITH ALKALI AMALGAM

BACKGROUND OF THE INVENTION

This invention relates to a method for the preparation of $\Delta^{2,5}$-dihydrophthalic acid by hydrogenating aqueous solutions of the alkali salt of the phthalic acid using alkali amalgam as reducing agent.

The marking of the position of the double bonds in the benzene ring follows the nomenclature introduced by Adolf Baeyer, according to which those carbon atoms are marked to which double bonds are connected. The carbon atoms in the ring are numbered counterclockwise, the carbon atoms, which carries the first of the two carboxyl groups, receiving the number 1.

Mainly in the English language literature, a different marking may sometimes be found, according to which those carbon atoms are marked that received hydrogen upon hydrogenating the benzene ring. Thus, $\Delta^{2,5}$-dihydrophthalic acid may also be called 1,4-dihydrophthalic acid and, also, $\Delta^{2,5}$-cyclohexadiene dicarboxylic acid-1,2.

Benzene dicarboxylic acids-(1,2) or their derivatives have beeen hydrogenated by various techniques. Thus, it is known to obtain hexahydrophthalic acid by hydrogenating potassium phthalate with molecular hydrogen in the presence of nickel under pressure at 300°C (Ber. dtsch. chem. Ges. 41, 1003 (1908), whereas the hydrogenation of phthalic acid anhydride with nickel at 200°C leads to phthalide (German Pat. No. 368,414). According to the state of the art it is however not possible to prepare dihydrogenated or tetrahydrogenated benzene dicarboxylic acids by hydrogenating the nucleus of benzene dicarboxylic acids with molecular hydrogen.

Cyclohexadiene dicarboxylic acids-1,2 or dihydrophthalic acids are of interest at intermediate products for polymer material, since they are both conjugated dienes and dibasic acids (U.S. Pat. No. 2,511,621).

The cyclohexadiene dicarboxylic acid was first described by Graebe and Born (Annalen 142 (1867), 330). Upon reducing a soda-alkaline aqueous solution of sodium phthalate in the cold with sodium amalgam, $\Delta^{3,5}$-dihydrophthalic acid was produced, while a mixture of several structurally isomeric tetrahydrophthalic acids resulted in the boiling heat.

According to Ind. Engng, Chem 48 (1956), 1253, the electrochemical reduction of phthalic acid on lead cathodes also produces trans-$\Delta^{3,5}$-dihydrophthalic acid.

It is further known that, in the case of some cyclohexadiene dicarboxylic acids, the position of the double bonds in the ring can be shifted by thermal or catalytic isomerization. Thus, Baeyer (A. 269 (1892) 194) describes the isomerization of $\Delta^{3,5}$-dihydrophthalic acid to $\Delta^{2,6}$-dihydro isomers by heating with water or lye.

Hitherto it was however not possible to make some of the isomeric cyclohexadiene dicarboxylic acids by any of the above methods. Thus, it was not possible to make the $\Delta^{2,5}$-dihydrophthalic acid by the direct reduction of the orthophthalic acid.

While it is true that $\Delta^{2,5}$-dihydrophthalic acid can be made from propiolic acid and vinyl acrylic acid by means of the dienesynthesis (Am. Soc. 87 (1965), 1927), its production on an industrial scale is handicapped by the high cost of the starting materials and the poor hydrophthalic acid yields.

BRIEF SUMMARY OF THE INVENTION

Surprisingly, it is now found that it is possible to obtain high yields of pure $\Delta^{2,5}$-dihydrophthalic acid, if the reaction conditions specified in the invention are observed when reducing aqueous solutions of alkali phthalate by means of alkali metal amalgam. In this process, neither are hydrophthalic acids produced which are tetrahydrogenated or hexahydrogenated in the nucleus nor are the carboxyl groups reduced. Nor do other structurally isomeric dihydrophthalic acids result as reaction product in addition to $\Delta^{2,5}$-dihydrophthalic acid. $\Delta^{2,5}$-dihydrophthalic acid has the following structure:

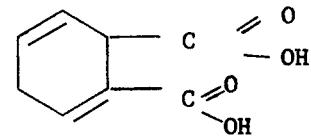

DETAILED DESCRIPTION AND EXAMPLES OF THE INVENTION

The aforementioned results are achieved according to the invention by observing the following mode of operation.

During the reaction of the alkali phthalate and alkali amalgam the aqueous solution is to contain free alkali hydroxide at all times so that the pH-value is more than 7, preferably between 10 and 14.

It is adequate to produce the alkali phthalate solution by dissolving phthalic acid anhydride in alkali hydroxide solutions, preferably caustic soda or caustic potash solution.

Alkali amalgam of any alkali concentration may be utilized for the hydrogenation. The solidification temperature of the alkali amalgam used actually represents the upper alkali content limit. Only the liquid state of aggregation of the alkali amalgam allows an exchange of material sufficiently intensive for the desired reaction. At 20° sodium amalgam is liquid up to 0.64% by wt. of Na, potassium amalgam up to 0.40% by wt. of K. If, on the other hand, the alkali concentration in the alkali amalgam is too low, uneconomically large amounts of amalgam have to be utilized.

Amalgams of potassium or sodium are used as alkali amalgam. The sodium amalgam, which is used preferably, has a sodium content between approx. 0.1 and 0.5% by wt. of sodium. The purity of the alkali amalgam used has to meet high requirements. It is found that, if the amalgam contains impurities such as e.g. electrode material or so-called "mercury butter", molecular hydrogen develops. However, only hydrogen in atomic form is capable of hydrogenating the benzene nucleus in the manner set forth in the invention.

For the method according to the invention it is advisable to use an alkali amalgam obtained in a chlorine-/alkali electrolysis.

It is preferable to utilize the quantity of alkali amalgam necessary to dihydrogenate the benzene nucleus or a slight excess thereof, although it is also possible to work with large excess.

The reaction temperature is to be between 10°C and the boiling temperature of the reaction solution, preferably between 10° and 90°C, better still between 20° and 70°C. Operation may be at normal pressure or elevated pressure.

At the reaction temperature an aqueous solution of alkali phthalate is stirred with alkali amalgam until the measured decrease in the alkali content of the alkali amalgam shows that the hydrogen quantity necessary for the dihydrogenation of the benzene nucleus has been produced and an alkali lye of given concentration can be determined analytically at the same time. If, for instance, a 0.25 molar sodium phthalate solution is used, an aqueous lye containing approx. 2% by wt. of sodium hydroxide is produced after dihydrogenation.

In order to be sure to obtain a pure $\Delta^{2,5}$-dihydrophthalic acid, it is sufficient to remain one-half degree below the respective boiling temperature.

The following examples shall illustrate the invention without, however, having a limiting effect thereon. The materials produced are suitable as auxiliary materials in the dyeing of textiles.

EXAMPLE 1

An enamelled 100 ltrs. vessel is used as reactor; therein, the starting solution is prepared as follows:

First, 40 ltrs. of water are filled into the vessel. Then, while stirring, 0.9 kg. of a 98% caustic soda lye are dissolved therein and subsequently 1.5 kg. of phthalic acid anhydride are stirred in until complete dissolution is obtained.

The ready quarter-molar aqueous sodium phthalate solution is adjusted to a lye reagent value of 2 grams/ltr. 34 ltrs. of solution containing 460 kg. of sodium amalgam having a sodium content of 0.40% by wt. are added to this starting solution. By external heating of the reactor the reaction solution is maintained at a temperature of 40°C. A pH-value of 14 is then measured in the solution. The amalgam and reaction solution are stirred continuously. If pure amalgam is used, no molecular hydrogen escapes in gaseous form.

The progress of the reaction is observed by measuring the sodium content of the amalgam every hour. It is found that, during the first hour, the hydrogenation of the sodium phthalate proceeds rapidly, but slows down later on. After a reaction time of 40 hours hydrogenation has virtually come to a standstill. At that point the sodium content has dropped to 0.29% by wt. of sodium in the sodium amalgam.

Then, the reaction solution is worked up as follows:

The solution is filtered off by suction from the amalgam and filled into an enamel container. While stirring, concentrated hydrochloric acid is added until the solution shows an acid reaction and the hydrogenated phthalic acid has precipitated. The neutralization heat is removed by means of a jacket cooling. When the temperature of the solution has reached 10°C, the acids are filtered off through a ceramic suction filter and washed with a small quantity of cold water to free them of salts. Thereupon the acids are dried in a vacuum drying oven at 100°C. 1.48 kg of acid are obtained, which is referred to as crude acid. The quantity of crude acid obtained corresponds to a material yield of 87% in relation to phthalic acid anhydride used.

The material yield increases to 96% if the water-soluble portion of the acids is obtained by extraction, e.g. with ether. 70% of this water-soluble acid portion consist of phthalic acid and 30% of $\Delta^{2,5}$-dihydrophthalic acid.

The following analytical methods are used in order to determine the composition of the crude acid: iodine number, infra-red + ultraviolet spectrum analysis of the acids and the dimethyl esters, gas chromatographic analysis of the dimethyl esters, nuclear magnetic resonance spectroscopy. The evaluation of the analyses listed shows that, when using the method according to the invention, the only and homogeneous reaction product obtained is $\Delta^{2,5}$-dihydrophthalic acid. The only by-product is unreacted phthalic acid. the theoretical iodine number of pure $\Delta^{2,5}$-dihydrophthalic acid is 151. The iodine number of 140 measured in the crude acid shows that same contains 92% of $\Delta^{2,5}$-dihydrophthalic acid. The gas chromatographic analysis of the dimethyl esters prepared form this crude acid by dimethyl esterification confirms this composition. The conversion of phthalic acid anhydride into $\Delta^{2,5}$-dihydrophthalic acid is 82.8%. There is a great difference between $\Delta^{2,5}$-dihydrophthalic acid and phthalic acid as to their solubilities in water. Phthalic acid is considerably more readily soluble in water than $\Delta^{2,5}$-dihydrophthalic acid. This difference in solubilities makes it possible to separate the two acids from each other. After recrystallizing twice from water, very pure $\Delta^{2,5}$-dihydrophthalic acid is produced having a melting point of 222°C.

EXAMPLE 2

The reaction was repeated as described in example 1, but a reaction temperature of 68°C was used. In addition to the starting material, only $\Delta^{2,5}$-dihydrophthalic acid was obtained as reaction product.

EXAMPLE 3

The reaction is repeated analogous to example 1, using at 45°C the equivalent quantity of caustic potash solution in place of caustic soda solution and the equivalent quantity of potassium amalgam (0.35% by wt. of K) in place of the sodium amalgam. After separating from the starting material and purification as in example 1, a yield of 85% is obtained of pure $\Delta^{2,5}$-dihydrophthalic acid in relation to the phthalic acid used.

The preferable weight percentage of potassium in the amalgam which is used in the instant process would be from about 0.1 to 0.35 % by wt. of K.

What is claimed is:

1. A method for the preparation of $\Delta^{2,5}$-cyclohexadiene dicarboxylic acid-1,2 comprising
   reacting alkali metal amalgam with an alkali phthalate solution at a temperature from about 10° to 90°C and a pH greater than 7 whereby the phthalate is reduced to form $\Delta^{2,5}$-cyclohexadiene dicarboxylic acid-1,2.

2. The method of claim 1 wherein the reaction is carried out by heating the alkali amalgam and alkali phthalate solution.

3. The method of claim 2 wherein the heating takes place at temperatures of from about 20°C to 70°C.

4. The method of claim 2 wherein reaction is carried out at a pH of between 10 and 14.

5. The method of claim 1 wherein the alkali metal amalgam used is obtained from a chlorine alkali metal electrolysis.

6. The method of claim 1 wherein the alkali metal amalgam contains between about 0.1 to 0.5 weight percent alkali metal.

7. The method of claim 1 wherein alkali amalgam used in the reaction is potassium amalgam.

8. The method of claim 1 wherein the alkali amalgam used in the reaction is sodium amalgam.

9. The method of claim 1 wherein the reaction product is recovered by removing the residual amalgam and acidifying the solution resulting in precipitation of the $\Delta^{2,5}$-cyclohexadiene dicarboxylic acid.

10. A method for the preparation of $\Delta^{2,5}$-cyclohexadiene dicarboxylic acid-1,2 comprising:
   a. providing an aqueous solution of alkali phthalate at a PH greater than 7;
   b. reacting alkali metal amalgam with the alkali phthalate solution by means of heating the reaction mixture to temperatures of from about 10° to 90° C; and
   c. recovering a reaction product of $\Delta^{2,5}$-cyclohexadiene dicarboxylic acid-1,2.

11. A method for preparing $\Delta^{2,5}$-cyclohexadiene dicarboxylic acid 1,2 which comprises contacting an alkali metal amalgam with an alkali phthalate in solution at a temperature from about 10° to 90°C at a pH greater than 7 and recovering $\Delta^{2,5}$-cyclohexadiene dicarboxylic acid 1,2.

* * * * *